(12) United States Patent
Laser

(10) Patent No.: US 7,712,667 B2
(45) Date of Patent: May 11, 2010

(54) HAND HELD WIRELESS READING VIEWER OF INVISIBLE BAR CODES

(76) Inventor: Vadim Laser, 8255 Spinnaker La., Maineville, OH (US) 45039

( * ) Notice: Subject to any disclaimer, the term of this patent is extended or adjusted under 35 U.S.C. 154(b) by 0 days.

(21) Appl. No.: 12/416,602

(22) Filed: Apr. 1, 2009

(65) Prior Publication Data

US 2009/0194594 A1 Aug. 6, 2009

Related U.S. Application Data

(63) Continuation of application No. 11/308,079, filed on Mar. 6, 2006, now Pat. No. 7,516,899.

(51) Int. Cl.
*G06K 7/10* (2006.01)

(52) U.S. Cl. .................. 235/468; 235/454; 235/472.01

(58) Field of Classification Search ................. 235/468, 235/454, 472.01, 439, 462.42
See application file for complete search history.

(56) References Cited

U.S. PATENT DOCUMENTS 6,561,429 B2 * 5/2003 Bryant et al. .......... 235/462.43

* cited by examiner

*Primary Examiner*—Seung H Lee
(74) *Attorney, Agent, or Firm*—Hasse & Nesbitt LLC; Daniel F. Nesbitt

(57) ABSTRACT

Hand held wireless reading viewer for bar codes printed with fluorescing inks that are invisible to the human eye. The reading viewer comprises a portable housing with a window transparent to the excitation and emission wavelengths, an LED or laser diode illuminator module having optical filter and diffuser, an image sensor module with a spectral band limited imaging optics, real time LCD video display, microprocessor with an image acquisition circuit, RF communications port, battery and self-destruct intrusion detector.

16 Claims, 2 Drawing Sheets

HAND HELD WIRELESS READING VIEWER OF INVISIBLE BAR CODES

CROSS-REFERENCE TO RELATED APPLICATIONS

This application is a continuation application of U.S. Ser. No. 11/308,079 filed Mar. 6, 2006 now U.S. Pat. No. 7,516,899, the disclosure of which are incorporated herein by reference.

BACKGROUND OF THE INVENTION

This invention is concerned with the devices for viewing, scanning and reading information printed in the form of invisible patterns such as two-dimensional and one-dimensional bar codes. The need for this kind of devices has emerged and growing in connection with proliferation of illegally made products and documents. One of the potent ways to counter spread of counterfeit products and forged documents is to authenticate and trace migration of articles by the use of bar codes invisible to an unaided eye. Such invisible bar codes are often printed with the inks containing low concentration of colorless chemical compound fluorescing in the near infrared spectrum. In order to authenticate an article or find out the content of the covert bar code in a warehouse or in a field a portable wireless device is needed that is capable to detect the invisible bar code then acquire its image and decode its content. There are many different hand held bar code readers available for reading visible one-dimensional and two-dimensional bar codes. Reading of a bar code requires simply aiming of the scanner at the bar code pattern. All these readers belong to one of the two general categories: moving beam scanners and scanners based on imaging devices. The moving beam scanners emit a mechanically oscillating laser beam, usually of red color. User points the visible scanning pattern to overlap or cross the visible bar code. An imaging scanner needs the target space be illuminated either with ambient light or an auxiliary on-board light source. Such light source may be visible or near IR. Neither the IR illuminating beam nor ambient light assist in aiming of the scanner at the targeted bar code. Such scanners are always equipped with targeting beams that create bright visible fiducial marks on the targets. The equipment designers add such beams specifically to facilitate aiming of their scanners at the target. When the target bar code pattern is invisible the operator often does not know exact location of the bar code and would have a disturbing task of finding a bar code and precise aiming of the scanner at the invisible indicia. Even the targeting beams that create visible fiducial marks would not help much. The other problem of successfully reading the invisible bar codes is that the invisible fluorescing indicia often emit a very weak signal due to low concentration of invisible ink. The low concentration of ink helps to make the bar code pattern as difficult to detect as possible without proper equipment. A print contrast may weaken due to age or become degraded from exposure to UV light, oxygen and other elements. An invisible bar code may be printed on an uneven surface. In all such cases quality of the invisible fluorescing image produced by the image sensor depends on a relative position of the excitation beam of the scanner and orientation of its receiving beam accepting the fluorescing image. The proposed invention provides solutions to all these challenges.

OBJECTS AND SUMMARY OF THE INVENTION

The object of this invention is to create a portable hand held device suitable for viewing invisible fluorescing or phosphorescing bar codes and quickly and reliably decode their data content.

Another object of this invention is to provide such hand held reading viewer of invisible bar codes that is capable of performing in presence of interfering ambient light.

Another object of this invention is to provide hand held reading viewer of invisible bar codes capable of displaying and successfully reading invisible bar codes printed on uneven surfaces of hard objects and packages.

Another object of this invention is to provide hand held reading viewer capable of performing with bar codes printed with fluorescing ink of low concentration. It is desirable to use invisible ink having concentration of fluorescent ingredient as low as possible for making the imprint difficult to detect and duplicate by counterfeiters.

One important aspect of the invention is providing a real time viewing of the invisible indicia on the miniature LCD video monitor with automatic decoding of the targeted invisible bar code as soon as its complete image appears on the screen. The electronic representation of image created by the image sensor is shared between the displaying components of the device and its image processing and decoding circuitry. This results in a convenience of viewing on the display the image that is an exact copy of the image available to the bar code searching and decoding processor. The image sensor output signal can be analog or digital. When an analog type sensor is used, a video speed analog to digital converter can be used to interface video signal to the microcomputer. A digital type sensor can be directly interfaced to the microcomputer. In this case an LCD display with the digital controller shall be used. Having a real time video display simplifies process of finding invisible indicia of a bar code and most favorable positioning of the portable scanner in respect to the said indicia. The operator has an advantage of viewing a good quality live video image of the invisible pattern and adjust position of the reader so the image appears with the smallest amount of distortions and of a best possible contrast.

The other aspect of the invention is making the important units of the portable reading viewer as easily replaceable modules. These modules include an illuminator module, imaging module, display module, decoding module, communication port module and power module. All modules are integrated in a compact hand held ergonomically shaped plastic enclosure. The illuminator module has useful and unique features not currently available in the art. Each replaceable illuminator module comprises an LED or array of LED; in some cases a laser diode is used in place of LED; an optical filter that blocks the undesirable wavelengths and a diffuser that makes smooth and even distribution of the excitation beam impinging on the area where the invisible bar code is expected to reside. There are important reasons why both the filter and diffuser are used. The unfiltered light emitted by an LED or LD is not perfectly monochromatic. Usually it contains not only wavelengths needed for excitation. A small portion of total emitted energy is carried on the wavelengths that are close to or the same as the wavelengths of emission of the invisible ink. Such crosstalk reduces contrast of the received image and can make viewing and decoding of the bar code impossible. The level of crosstalk between the excitation and receiving imaging channels depends on the concentration of the fluorophore in the invisible ink, degree of separation on the wavelength scale between the excitation and the peak of emission and quality of the bandwidth filters placed in the illuminator and imaging channels. There are two types of filters: absorption and interference. The absorption filters are usually less expensive, but interference filters provide better rejection outside of the nominal band and have much sharper transition between the transmission and rejection regions. In most demanding applications the interferential filters shall be the right choice. Theoretically, the interference filters work well in the optical systems where the wavefront of light is parallel to the filter surface. Practically, the angles of up to +/−15 degrees are acceptable. This is the reason that the filtering element must be positioned between the light source, such as LED or LD, and the diffusing element. The light shall pass through the filter first. If this condition is not met the light exiting the diffuser would impinge on the filter at wide range of incident angles thus reducing performance of the filter. The problem of crosstalk between the excitation source and imaging channel is evident in the system described in the U.S. Pat. No. 6,824,061 issued to Haffersley & Blackwell II. Such bar code reader cannot read bar codes printed with the inks fluorescent in blue color when excited with the soft UV light emitted by the UV LED. This is because the LED with the peak emission at 375 nm have broad enough spectrum to suppress the image of a bar code fluorescing at 400 nm and even at 450 nm. Inclusion of the correcting short pass or band pass filter in front of the LED would cancel this problem. Often more than one LED is required to illuminate an area of a bar code. An array of LED results in a beam with uneven distribution of intensity throughout its cross section. This may cause an image appear so much modulated by the unevenly illuminating beam that would present serious difficulties to the decoding software. Presence of the diffuser effectively remedies this problem.

In the proposed invention light from the illuminator module (also referred to as an excitation module) emanates as energy in the range of wavelengths from 300 nm to 2500 nm, and towards the window at an angle of 45 to 70 degrees to the window plane. Most of this light penetrates through the window and illuminates the surface of the targeted object. Some portion of this light reflects from the window surface and hits the enclosure wall on the side opposite from the illuminator. Further propagation of the excitation energy inside of the reader is undesirable since bouncing from the internal walls and components may result in stray light getting into the imaging lens. One easy solution is placement of an absorptive screen on the inside wall opposite from the illuminator module. The other solution is to place there a patch of retroreflective film such as Scotchlight™. Scotchlight™ is a trademark and product of 3M Company. It is made with the use of a layer of tiny glass spheres that reflect an incoming light back towards its source. Thus the light reflected by the window returns back to the window, increasing the overall efficiency of the illuminating system and reducing internal reflections.

The imaging module shall be constructed as an easily replaceable unit with a band pass optical filter integrated within the imaging lens. The filter can be placed in front or behind the lens. Placing the filter between the lens and the sensor increases the back focal length of the imaging lens, which helps to accommodate the filter inside of a given lens holder. A lens of telecentric type is preferred for reducing the incident angle of light impinging upon the interference filter. In order to accommodate the reading viewer for various applications using different invisible inks, all that needs to be done is to replace the corresponding pairs of illuminator and imaging modules. Thus, essentially the same construction of the portable reading viewer can be used to view and decode invisible bar codes printed with inks fluorescing under excitation of ultraviolet, visible or near infrared energy. Even when a UV ink fluorescing in visible spectrum is used, the real time video display provides unparallel convenience and ability to work in the strong ambient light conditions.

The portable reading viewer shall be an autonomous device. For this reason, the reading viewer is equipped with an on-board power supply and RF communication port. These features allow the reading viewer to be operational in the warehouse environment. The data read from the invisible bar codes printed on products in warehouse or on production lines can be sent immediately to the host computer for updating of or comparing with a database.

Since invisible bar codes typically used to protect documents or products from abuse, it is desirable to keep information on the physical properties of the covert invisible insignia unavailable to potential violators. An easy way to learn about the ink properties is to get hold of the reading viewer and to study how it works, to figure out the ink photonic features and then attempt to mimic the ink performance with a counterfeit material. In order to make such counterfeiting process more complicated and costly, the proposed reading viewer is equipped with the intrusion detector. Once the housing of the reading viewer opens, the intrusion detector changes its state. As soon as power is applied to the reading viewer, its microprocessor detects the changed state of the intrusion detector, which means that the integrity of the devise has been compromised. The microprocessor then initiates a self-destruct procedure that may induce physical damage to key components and erasure of the entire computer program. One simple but useful way to implement an intrusion detector is to connect a number of thin wires to the input pins of the microprocessor. One of these wires is a loop contacting two pins together. A thread, rod or other simple object is positioned in such a way that insures breaking of the wire loop in two separate wires when the case of the reading viewer opens. These two wires shall look indistinguishable from the other decoy wires. The intruder would have a small chance to make a right choice attempting to repair the broken pair of wires. Any wrong combination of connected wires would trigger the self-destruct action.

DETAILED DESCRIPTION OF THE PREFERRED EMBODIMENT(S)

Figure 1:
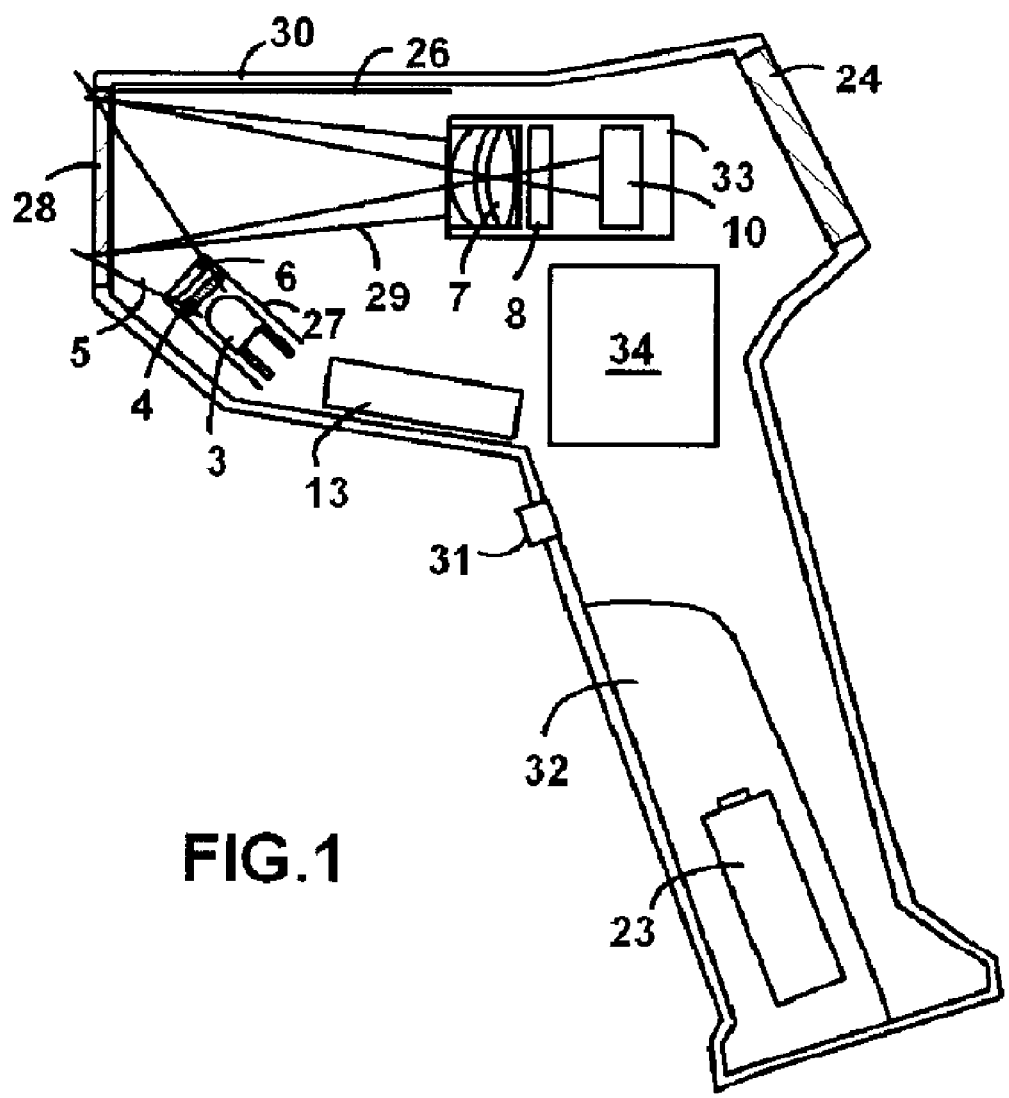
FIG. 1 is a schematic representation of the cross section of the portable reading viewer of invisible bar codes.

A hand held reading viewer of invisible bar codes, as its name suggests, performs two main functions. It allows one to view otherwise completely invisible symbols and to scan and decode those symbols when they represent a bar code. FIG. 1 illustrates a cross section of such portable reader that is convenient to hold in either the left or right hand and to aim at the area of interest. All components of the reading viewer are enclosed in the plastic housing 30, which has three features clearly identifiable from the outside. At the front, it has a flat window 28, its bottom portion is shaped as a handle 32 for gripping by hand and there is a video display 24 on the top of the rear portion of the case. The pushbutton 31 serves for initiating a viewing and reading session.

Inside the housing, there are a few removable modules. The excitation module 27 illuminates with the beam 5 the area of interest through the window 28. This module comprises the LED 3, excitation filter 4 and diffuser 6. The LED can be a single component or an array of LEDs. The solid-state laser diodes sometimes can be used instead of an LED. Whether a single LED or an array of LEDs is used, the optical front of the emitted energy is quite irregular. The diffuser 6 significantly smoothens the distribution of energy throughout the beam cross section. Depending on the required excitation bandwidth, the illumination module can have a UV, Blue, Green, Red or IR LED. For the UV excitation the Nichia LED NSHU590A or NSHU590B are used. They emit at 375 and 365 nm respectively. These LEDs have a narrow 10 degree beam and narrow 10 nm at 50% bandwidth. Yet, if the emission of the invisible ink is blue, the interference filter with the cutoff wavelength at about 390 to 400 nm shall be used in the position of the filter 4. Otherwise, the small amount of energy leaking from the LED at the wavelengths longer than 400 nm will reduce the image contrast of the invisible bar code to an unacceptable level.

Some invisible inks fluoresce at the excitation of violet, blue, green or other visible light. In order to work with such inks the illumination module shall contain an appropriate color LED 3 and a corresponding filter 4. The diffuser 6 can be lightly scattering translucent plate of glass or acrylic.

In the upper central part of the housing, an imaging module 33 resides between the front window 28 and the video display 24. The imaging module 33 is positioned intentionally on the axis passing through the center of the window 28 and the center of the screen of display 24. The Purdy Electronics display unit model AND-TFT-25PA works well in this application.

The optical axis of the imaging module 33 is directed at the center of the window 28. This topology enhances comfort of viewing the invisible indicia as the location of the virtual image on the screen 24 is coaxial with the actual invisible image of the print. The imaging module 33 comprises the imaging lens 7, bandwidth filter 8 and the image sensor 10, all housed in the opaque housing. The filter 8 is selected to pass the emitted energy of the fluorophore of the invisible ink and block all other energy coming through the lens. Though an absorption type filter can be used in many applications, the best performance is achieved with an interference band pass or high pass filter working in the essentially collimated light. In one embodiment of the device, the cut-off wavelength of the excitation filter is shorter than the cut-on wavelength of the emission filter. In another embodiment of the device, the cut-on wavelength of the excitation filter is longer than the cut-off wavelength of the emission filter. Thus, a telecentric type lens is preferable. The image sensor 10 can be a CCD, a CMOS or a focal plane array type imager. In the proposed preferred embodiment an analog type image sensor is used. The CMOS sensor model OV5116 manufactured by Omnivision Technology has good sensitivity in visible and near IR spectrums stretching from 400 nm to 1,100 nm. The CCD and focal plane array sensors benefit from the use of a telecentric lens because many of these sensors have a matrix of micro lenses in front of the individual pixels.

Presence of micro lenses limits the angle of acceptance of the pixels and the telecentric lens is very suitable for this application.

The video display 24 is a 2.5" in diagonal TFT LCD. It is tilted about 20 degrees upward to provide a viewing direction of the best contrast to the operator's eye.

The electronics of the reading viewer are concentrated in the module 34. The RF communications port module 13 is placed as shown on the lower portion of the hood-like upper part of the hosing 30. The battery module 23 is in the handle. It is a relatively heavy module and its low location facilitates the weight balance of the device during handling. The inside surface of the housing is painted with the black light absorbing coating. The film 26 attached to the top wall near the window 28 can be either fuzzy black for excellent absorption of the stray excitation light reflected inward by the window surfaces, or it can be a retro-reflective strip of Scotchlight® material for returning this light back toward the window. The Scotchlight® is a trademark of the 3M Company.

This architecture of the reading viewer allows it to be used for viewing and reading invisible bar codes printed with a very broad selection of invisible bar codes. Simply by placing a correct pair of two modules, the illumination module 27 and imaging module 33, it is possible to work with any invisible ink either down-converting (Stock's shift) or up-converting (Anti Stock's shift) fluorescing invisible materials.

The process of using the reading viewer consists of positioning the device in such a way that the window 28 is in a proximity of the area of the object where the invisible bar code is expected to be found. If, at least a portion of the invisible insignia is brought against the window 28, the image of that part of the bar code appears on the display screen. Depending on the optical magnification of the imaging module, the actual dimensions of the displaying image may appear larger or smaller of the real pattern it represents. Whenever feasible it is a good idea to design a total magnification factor of the system to be close to one. Then the image viewed on the screen will be almost the same size as the real invisible image printed on the object. Moving the reading viewer, the operator then performs task of bringing the pattern of the bar code presented on the screen as a live video to the center of the screen. The display provides a high resolution gray scale image, so it is easy to judge quality of the image by looking at it. Thus, it is quite easy and natural to find a position of the reading viewer, which provides the virtual image when it is better focused, more evenly illuminated and free from various artifacts. This is especially important when the invisible bar code is printed on surfaces that are not flat or otherwise irregular. As soon as the image of the invisible bar code is fully shown on the display, the reading part of the device electronics would decode its content and the human readable message appears on the screen.

Figure 2:
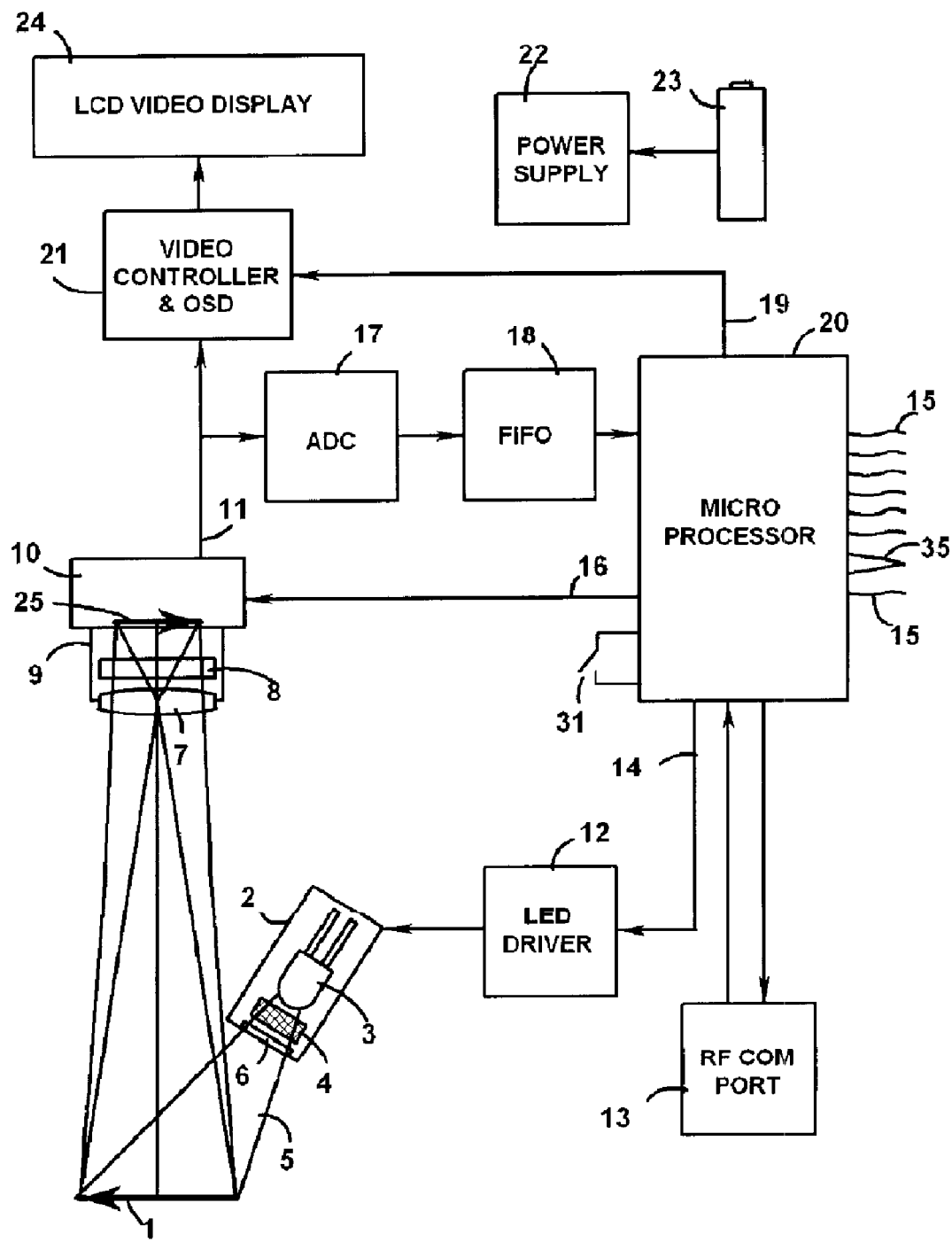
FIG. 2 is a block diagram of a reading viewer device. It shows all essential components of the working devise and interactions between them.

Here is a condensed description of main processes. When the invisible bar code is presented on the outside of the window 28 and the pushbutton 31 is activated, the light beam emanating from the illuminator 2 of the illumination module 27 (also known as the excitation module) causes the invisible pattern to fluoresce. The fluorescing image may be of infrared nature and totally invisible to a human eye, or it may be glowing in some visible color, usually barely detectable due to low concentration of the fluorophore. The lens 7 captures part of the fluorescent energy and builds up an image 25 of the bar code 1 on the sensitive plane of the image sensor 10. The electronic signals produced by the image sensor 10 pass to the real time video display unit 24 and simultaneously to the bar code decoding electronics. FIG. 2 depicts the block diagram of the device and helps to understand better its inner workings. The microcomputer 20 generates all control signals and processes the image information. The most computationally intensive task is processing the image of an invisible bar code, finding bar code boundaries and decoding its content. The DSP type microprocessor model TMS320VC33 is selected for such a task. On power up, the microprocessor initiates the image sensor 10 via the control line 16 and using the control line 19 displays an opening message on the LCD display 24 using the on screen display feature of the video controller 21. Manufactured by ST Microelectronics part STV5730A works well in such video controller capacity. After a few seconds allocated for viewing the opening message, the microprocessor switches the video controller 21 into a pass through state. The signals generated by the image sensor 10 go via the line 11 to the video controller 21 and become available to the LCD panel 24. Since the LED 3 at this time is not active, the display is dark. Pressing of the pushbutton 31 causes the microprocessor to activate the LED 3 of the illuminator 2 via the line 14 and the LED driver 12. The invisible bar code 1 produces the fluorescing light, which is focused by the lens 7 onto the image sensor 10. This focused image 25 has a high contrast because the band pass filter 8 readily passes the fluorescent energy collected by the lens 7 without a significant attenuation. However, the filter 8 blocks the excitation energy produced by the LED 3, because the transmittance bands of the filters 4 and 8 are mutually exclusive. The image of the bar code 1 now appears on the LCD display 24. The analog video signals from the sensor 10 are being converted to digital form by the component 17. A Texas Instrument ADC converter part number TLC876 can be used for this purpose. Pixel by pixel the digitized image reaches the microprocessor data inputs via the FIFO 18. The FIFO 18 serves a purpose to assure reliable acquisition of the image data in the situation when the image sensor 10 runs at its own speed asynchronous to the microprocessor. When the microprocessor acquires a complete image frame, it attempts to find and decode the image of the bar code 1. After a successful decode, the message encoded in the bar code 1 is displayed on the LCD display 24 by the microprocessor via the line 19 and video controller 21. Depending on the application needs, the same message can be uploaded via the RF communication port 13 to an outside device. For enhanced system security, the reading viewer has an intrusion protection feature. In this embodiment, a simple intrusion protection scheme is implemented using an array of thin wires 15 and 35 connected to the microprocessor inputs. The difference between the wires 15 and a wire 35 is that the wire 35 is a loop connecting two of the inputs. A thread may be passing through this wire loop 35. The ends of the thread are attached to both halves of the closed housing 30. As soon as the halves of the housing are separated slightly during opening of the case, the thread tensions and breaks the wire loop in two wires. Now there are only a number of thin wires connected on one end to the microprocessor pins. If this happens at the time when the microprocessor runs, it will immediately go into a self-destruct procedure. Then the microprocessor can cause a failure to a delicate circuit component by a voltage pulse exceeding the component maximum tolerance, in addition it will erase the program memory. If the intrusion happens when the device is not operating, the same self-destructing process will be initiated at the first moments when the power is applied. Other types of intrusion detectors can be implemented, such as unnoticeable mechanical contacts or light detectors changing state when the reading viewer housing is open.

The power supply circuit 22 derives energy from the portable battery 23 and generates all needed voltages.

I claim:

1. A device for viewing, scanning and decoding of invisible fluorescing or phosphorescing bar codes, wherein the device comprises a compact housing, the housing containing components including:

i) an illumination module for emitting excitation energy at an invisible fluorescing or phosphorescing bar code, including an excitation light source, an excitation band pass filter, and a light diffuser,
   ii) an optical window transparent to the excitation energy and to an emission energy emitted from the excited invisible bar code,
   iii) a member selected from an absorptive screen that absorbs a portion of the excitation energy that has reflected inwardly from the optical window, and a retro-reflective film that returns such portion of the excitation energy back toward the optical window,
   iv) an imaging module including a video image sensor, a lens, and an emission band pass filter,
   v) a video display module including a video display with on-screen data display capability,
   vi) an image processing and bar code decoding microprocessor, and
   vii) a battery.

2. The device according to claim 1, the housing further containing an RF communication port.

3. The device according to claim 1, wherein the member is positioned on an inside wall of the housing opposite from the illumination module.

4. The device according to claim 1, wherein the member is the retro-reflective film.

5. The device according to claim 4, wherein the retro-reflective film is positioned on an inside wall of the housing opposite from the illumination module.

6. The device according to claim 1, wherein the member is the absorptive screen.

7. The device according to claim 6, wherein the retro-reflective film is positioned on an inside wall of the housing opposite from the illumination module.

8. The device according to claim 1, wherein the imaging module is located between the video display module and the optical window, such that the imaging module coincides with the respective optical axes passing through the centers of the video display and the optical window.

9. The device according to claim 1, wherein the cut-off wavelength of the excitation filter is shorter than the cut-on wavelength of the emission filter.

10. The device according to claim 1, wherein the cut-on wavelength of the excitation filter is longer than the cut-off wavelength of the emission filter.

11. The device according to claim 1, wherein the excitation filter is positioned between the solid-state light source and the diffuser.

12. The device according to claim 1, wherein the video display module includes an LCD panel.

13. The device according to claim 1, wherein the illumination module emits energy in the range of wavelengths from 300 nm to 2500 nm.

14. The device according to claim 1, wherein the video image sensor outputs an analog signal.

15. The device according to claim 1, wherein the video image sensor outputs a digital signal.

16. The device according to claim 1, further including a handle.

\* \* \* \* \*